(12) United States Patent
Kim et al.

(10) Patent No.: US 9,160,015 B2
(45) Date of Patent: Oct. 13, 2015

(54) HUMIDIFIER FOR FUEL CELL

(75) Inventors: Kyoung-Ju Kim, Yongin-si (KR);
Yong-Cheol Shin, Seoul (KR);
Moo-Seok Lee, Seoul (KR)

(73) Assignee: KOLON INDUSTRIES, INC.,
Kwacheon-Si (KR)

( * ) Notice: Subject to any disclaimer, the term of this patent is extended or adjusted under 35 U.S.C. 154(b) by 174 days.

(21) Appl. No.: 13/510,972

(22) PCT Filed: Dec. 3, 2010

(86) PCT No.: PCT/KR2010/008637
§ 371 (c)(1),
(2), (4) Date: Jul. 20, 2012

(87) PCT Pub. No.: WO2011/068383
PCT Pub. Date: Jun. 9, 2011

(65) Prior Publication Data
US 2012/0282533 A1    Nov. 8, 2012

(30) Foreign Application Priority Data

Dec. 4, 2009  (KR) .................. 10-2009-0119583
Dec. 3, 2010  (KR) .................. 10-2010-0122459

(51) Int. Cl.
*H01M 8/06*    (2006.01)
*H01M 8/04*    (2006.01)
(Continued)

(52) U.S. Cl.
CPC .......... *H01M 8/04149* (2013.01); *B01D 63/02* (2013.01); *B01D 2313/12* (2013.01); *B01D 2313/20* (2013.01); *B01D 2313/21* (2013.01); *H01M 2008/1095* (2013.01); *Y02E 60/50* (2013.01)

(58) Field of Classification Search
None
See application file for complete search history.

(56) References Cited

U.S. PATENT DOCUMENTS 4,384,873 A *  5/1983  Herr .............................. 96/374
2001/0015500 A1  8/2001  Shimanuki et al.
(Continued)

FOREIGN PATENT DOCUMENTS

| CN | 1323073 A | 11/2001 |
|---|---|---|
| CN | 1471620 A | 1/2004 |

(Continued)

OTHER PUBLICATIONS

JP 2008-269867, Kawabata et al., DERWENT English Summary, Nov. 6, 2008.*

(Continued)

*Primary Examiner* — Patrick Ryan
*Assistant Examiner* — Jose Colucci Rios
(74) *Attorney, Agent, or Firm* — Sughrue Mion, PLLC (57) ABSTRACT

Disclosed is a humidifier for fuel cell including a membrane housing including a first end, a second end positioned at an opposite side of the first end, and plural holes provided along the outer circumferential surface of the second end; hollow fiber membranes having both ends respectively potted into the first and second ends of the membrane housing, wherein the hollow fiber membranes are positioned inside the membrane housing; and a cap including an inlet for moisture-containing unreacted gas, wherein the cap is installed at the second end of the membrane housing, and an inner surface of the cap is provided with plural projections enabling the moisture-containing unreacted gas supplied through the inlet to be uniformly distributed to the plural holes.

5 Claims, 5 Drawing Sheets (51) Int. Cl.
*B01D 63/02* (2006.01)
*H01M 8/10* (2006.01)

(56) References Cited

U.S. PATENT DOCUMENTS

| | | |
|---|---|---|
| 2001/0021467 A1 | 9/2001 | Suzuki et al. |
| 2002/0039674 A1* | 4/2002 | Suzuki et al. ............... 429/30 |
| 2005/0110172 A1 | 5/2005 | Tanaka et al. |
| 2006/0147774 A1* | 7/2006 | Suzuki et al. ............... 429/26 |
| 2007/0210463 A1* | 9/2007 | Koenig et al. ............... 261/100 |
| 2007/0257384 A1* | 11/2007 | Sung et al. ............... 261/119.1 |
| 2008/0067700 A1 | 3/2008 | Korytnikov et al. |
| 2008/0079180 A1 | 4/2008 | Kim |
| 2009/0226784 A1* | 9/2009 | Kim ............... 429/26 |
| 2011/0129740 A1* | 6/2011 | Koo ............... 429/413 |
| 2012/0094197 A1* | 4/2012 | Ko et al. ............... 429/414 |
| 2012/0270120 A1 | 10/2012 | Kim et al. |

FOREIGN PATENT DOCUMENTS

| | | |
|---|---|---|
| CN | 101238606 A | 8/2008 |
| CN | 101534934 A | 9/2009 |
| JP | 200534715 A | 2/2005 |
| JP | 2008041335 A | 2/2008 |
| JP | 2008309371 A | 12/2008 |
| WO | 2009/110114 A1 | 9/2009 |
| WO | 2011122822 A2 | 10/2011 |

OTHER PUBLICATIONS

International Searching Authority, International Search Report for PCT/KR2010/008637 dated Aug. 23, 2011.
State Intellectual Property Office of the People's Republic of China, Communication dated Feb. 8, 2014, issued in corresponding Chinese Application No. 201080055045.9.
European Patent Office, Communication dated Jan. 5, 2015, issued in corresponding European Application No. 10834798.0.

* cited by examiner

HUMIDIFIER FOR FUEL CELL

TECHNICAL FIELD

The present invention relates to a humidifier, and more particularly, to a humidifier for fuel cell.

BACKGROUND ART

A fuel cell is an electrochemical cell which generates electricity by combination of hydrogen and oxygen. Unlike a general chemical cell, the fuel cell can generate electricity continuously as long as the necessary hydrogen and oxygen are supplied. In addition, the fuel cell has no heat loss so that efficiency of the fuel cell is twice as high as efficiency of internal combustion engine. Furthermore, since the fuel cell directly converts chemical energy generated by combination of hydrogen and oxygen into electric energy, the fuel cell is eco-friendly, and is capable of being operated without worries about the exhaustion of fossil fuel.

Based on the type of electrolyte, the fuel cell may be classified into polymer electrolyte fuel cell, phosphoric acid fuel cell, molten carbonate fuel cell, solid oxide fuel cell, and alkaline fuel cell. These fuel cells are basically operated based on the same principle. However, the kind of fuel, operation temperature, catalyst, and electrolyte for each kind of fuel cell may be different. Among the aforementioned fuel cells, the polymer electrolyte fuel cell may be operated at a relatively-lower temperature, and may be formed in a compact size owing to a large output density, whereby the polymer electrolyte fuel cell is suitable for a transport system as well as a small-sized mounting type generating apparatus.

One of the most important methods to improve efficiency of the polymer electrolyte fuel cell is to maintain moisture content by supplying predetermined moisture to polymer electrolyte membrane of membrane-electrode assembly. This is because the generating efficiency is rapidly lowered together with dry of the polymer electrolyte membrane.

A method for humidifying the polymer electrolyte membrane is a membrane humidifying method for supplying moisture to flowing gas through the use of polymer separation membrane.

The membrane humidifying method uses a membrane which selectively permeates only vapor contained in unreacted gas, to thereby supply the vapor contained in the unreacted gas to the polymer electrolyte membrane. This method is advantageous in that it can manufacture a small-sized humidifier with lightness in weight.

If the selective permeation membrane used for the membrane humidifying method forms a module, it is preferable to use hollow fiber membranes having a large permeation area per unit volume. That is, if fabricating the humidifier with the hollow fiber membranes, the hollow fiber membranes having a large contact surface area can be highly integrated so that the fuel cell is sufficiently humidified even with small volume. In this case, the humidifier with the hollow fiber membranes can be fabricated of a low-priced material. Also, moisture and heat contained in unreacted gas discharged at a high temperature from the fuel cell may be collected and reused in the humidifier.

Figure 1:
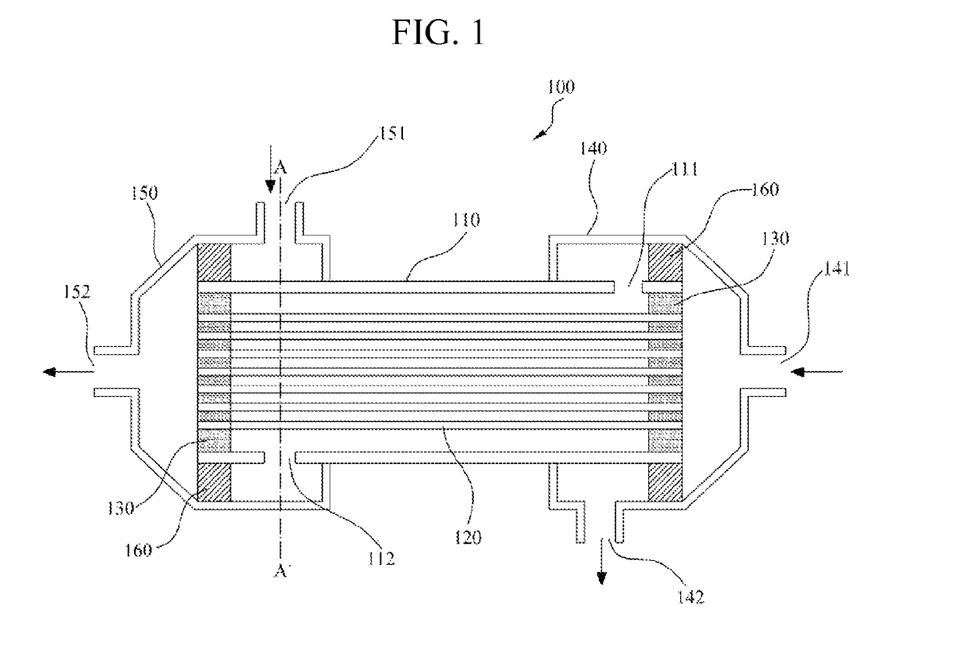
FIGS. 1 and 2 are cross section views illustrating a tube-shaped humidifier for fuel cell according to the related art.
Figure 6:
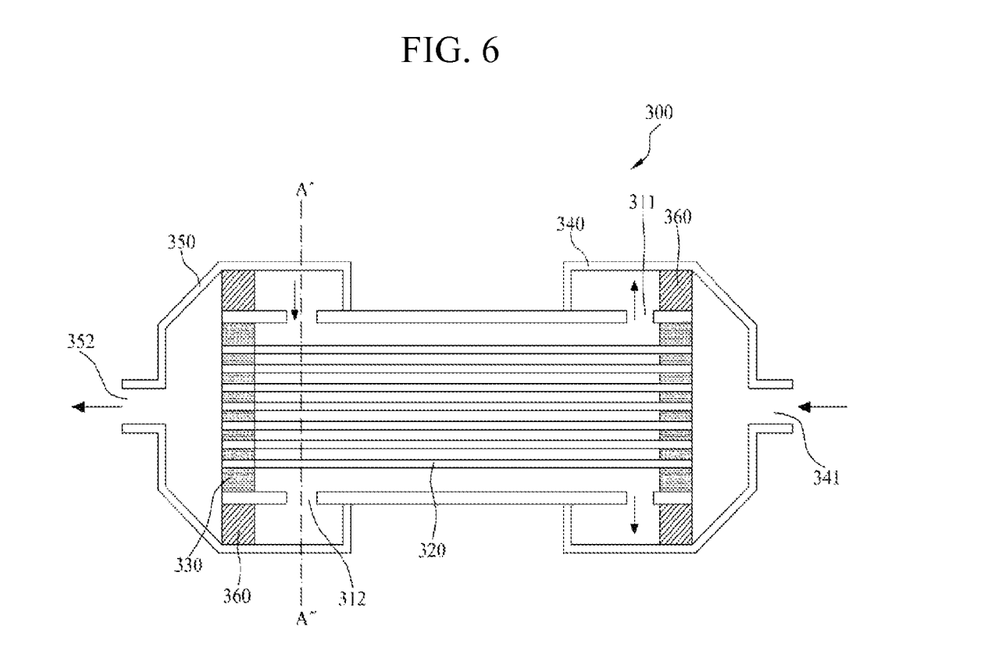
FIGS. 6 and 7 illustrate cross section views illustrating a square pillar shaped humidifier for fuel cell according to the related art.

FIGS. 1 and 6 illustrate a humidifier 100 and 300 for fuel cell 100 according to the related art. FIG. 1 illustrates the tube-shaped humidifier 100, and FIG. 6 illustrates the square pillar-shaped humidifier 300. As shown in FIGS. 1 and 6, the humidifier 100 and 300 for fuel cell includes a membrane housing 110 and 310 with a bundle of hollow fiber membranes 120 and 320. In this case, a first inlet 141 and 351 for reaction gas to be supplied to the fuel cell (not shown) is formed at one side of the membrane housing 110 and 310; and a second outlet 152 and 352 for supplying humidified reaction gas to the fuel cell is formed at the other side of the membrane housing 110 and 310. Also, a second cap 150 and 350 having a second inlet 151 and 351 for moisture-containing unreacted gas discharged from the fuel cell is provided at one side of the membrane housing 110 and 310; and a first cap 140 and 340 having a first outlet 142 and 342 for discharging the unreacted gas supplied to the inside of the membrane housing 110 and 310 through the second inlet 151 and 351 is provided at the other side of the membrane housing 110 and 310. Meanwhile, plural second holes 112 and 312 are formed on the outer circumferential surface of the membrane housing 110 and 310 at which the second cap 150 and 350 having the second inlet 151 and 351 is installed.

The aforementioned humidifier 100 and 300 for fuel cell is disadvantageous in that the moisture-containing unreacted gas supplied through the second inlet 151 and 351 is not uniformly distributed to the entire bundle of the hollow fiber membranes 120 and 320. That is, since most of the supplied moisture-containing unreacted gas maintains straightness, the flow of the supplied moisture-containing unreacted gas is concentrated on the holes near to the second inlet 151 and 351 among the plural second holes 112 and 312. As a result, the moisture is supplied only to the reaction gas flowing in the hollow of the hollow fiber membranes being in contact with the moisture-containing unreacted gas, and is not supplied to the reaction gas flowing in the hollows of the remaining hollow fiber membranes. Accordingly, the remaining hollow fiber membranes are rarely utilized for the humidifying process, to thereby deteriorate the humidifying efficiency of the humidifier 100 and 300.

Figure 7:
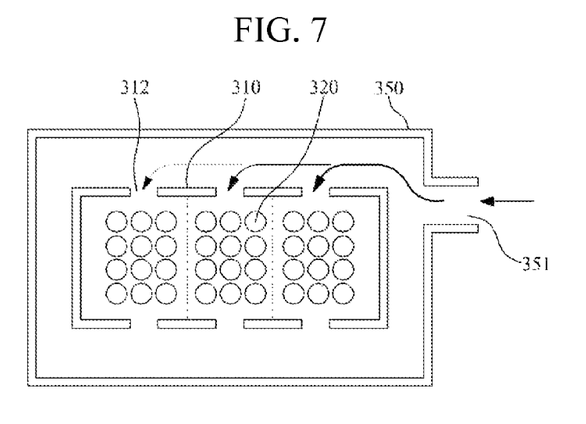

Especially, as shown in FIG. 7, unlike the tube-shaped humidifier 100, the square pillar-shaped humidifier 300 has no obstacles therein, whereby most of the unreacted gas supplied through the second inlet 351 maintains straightness. Thus, the unreacted gas is concentrated to the hollow fiber membranes near to the second inlet 351, whereby the humidifying efficiency of the square pillar-shaped humidifier 300 is more lowered.

DISCLOSURE

Technical Problem

Therefore, the present invention has been made in view of the above problems, and it is an aspect of the present invention to provide a humidifier for fuel cell which is capable of preventing one or more problems of the related art.

Another aspect of the present invention is to provide a humidifier for fuel cell which is capable of realizing high humidifying efficiency owing to the maximum contact area of hollow fiber membranes with reaction gas to be supplied to the fuel cell by enabling the uniform humidifying level in all the hollow fiber membranes provided inside the humidifier.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, as embodied and broadly described herein, there is provided a humidifier for fuel cell comprising: a membrane housing including a first end, a second end positioned at an opposite side of the first end, and plural holes provided along the outer circumferential surface of the second end; hollow fiber membranes having both ends respectively potted into the first and second ends of the membrane housing, wherein the hollow fiber membranes are positioned inside the membrane housing; and a cap including an inlet for moisture-containing unreacted gas, wherein the cap is installed at the second end of the membrane housing, and an inner surface of the cap is provided with plural projections enabling to uniformly distribute the moisture-containing unreacted gas supplied through the inlet to the plural holes.

At this time, the projections are provided in one-to-one correspondence with the holes of the membrane housing.

Also, the projections are positioned above the respective holes of the membrane housing.

The membrane housing is formed in a tube shape or polygonal pillar shape.

Furthermore, the polygonal pillar-shaped membrane housing includes inside partitions.

The polygonal pillar-shaped membrane housing is square pillar-shaped membrane housing.

The cap includes an outlet being in communication with the hollow of the hollow fiber membranes, wherein humidified reaction gas from the hollow of the hollow fiber membranes is discharged through the outlet, and is supplied to the fuel cell.

Advantageous Effects

According to the humidifier of fuel cell of the present invention, moisture-containing unreacted gas is uniformly supplied to all hollow fiber membranes inside the humidifier, which enables to uniformly humidify all reaction gas passing through the hollow fiber membranes inside the humidifier. Thus, the humidifier for fuel cell according to the present invention allows the improved humidifying efficiency.

Also, the moisture-containing unreacted gas is uniformly supplied to all hollow fiber membranes inside the humidifier, to thereby prevent uneven contamination in some particular hollow fiber membranes, and to allow an extended replacement period of the hollow fiber membranes.

BEST MODE

Reference will now be made in detail to the preferred embodiments of the present invention, examples of which are illustrated in the accompanying drawings. Wherever possible, the same reference numbers will be used throughout the drawings to refer to the same or like parts.

Hereinafter, a humidifier for fuel cell according to the present invention will be described with reference to the accompanying drawings.

Figure 3:
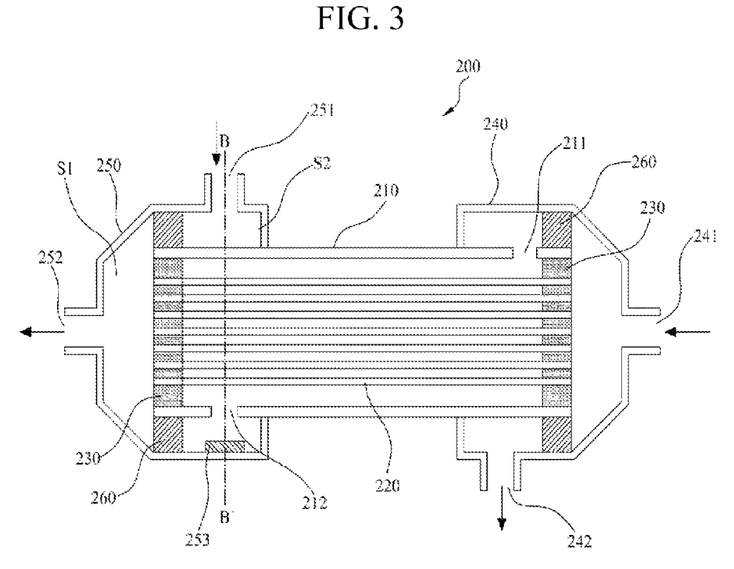
FIGS. 3 to 5 illustrate a tube-shaped humidifier for fuel cell according to one embodiment of the present invention.
Figure 4:
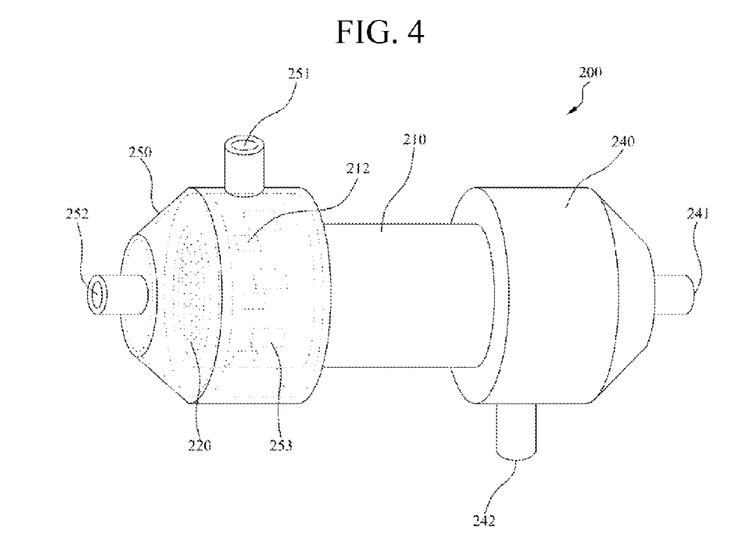
Figure 5:
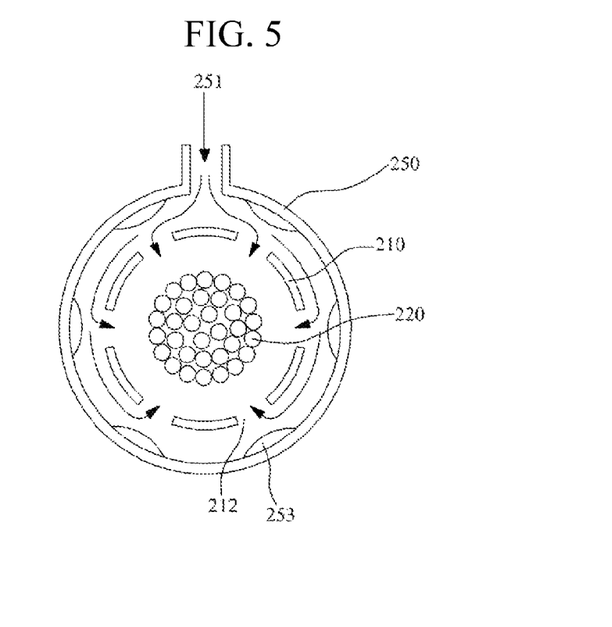

FIGS. 3 to 5 are cross-section and schematic views illustrating a tube-shaped humidifier 200 according to one embodiment of the present invention.

The tube-shaped humidifier 200 includes a tube-shaped membrane housing 210 whose both ends are open. The tube-shaped membrane housing 210 includes first and second ends which are positioned at opposite sides. In this case, plural first holes 211 are formed along the circumference of the first end, and plural second holes 212 are formed along the circumference of the second end. Inside the membrane housing 210, there is a bundle of hollow fiber membranes 220. Both ends of the hollow fiber membranes 220 are potted into the first and second ends of the membrane housing 210 by a potting material 230. Both ends of the hollow fiber membranes 220 remain open so that fluid outside the membrane housing 210 flows through the hollow of the hollow fiber membranes 220. Also, since both ends of the membrane housing 210 are filled with the potting material 230, the fluid flows into and out of the membrane housing 210 only via the first and second holes 211 and 212 of the membrane housing 210.

A first cap 240 is installed at the first end of the membrane housing 210. The first cap 240 includes a first inlet 241 for reaction gas to be supplied to the inside of fuel cell from the external. In this case, a sealing portion 260 is provided between an inner surface of the first cap 240 and the first end of the membrane housing 210, to thereby prevent the reaction gas supplied through the first inlet 241 from flowing into the membrane housing 210 through the plural first holes 211. That is, the first inlet 241 of the first cap 240 is in communication only with the hollow of the hollow fiber membranes 220 so that the reaction gas supplied through the first inlet 241 flows only into the hollow of the hollow fiber membranes 220.

A second cap 250 is installed at the second end of the membrane housing 210. The second cap 250 includes a second inlet 251 for moisture-containing unreacted gas supplied from the fuel cell (not shown). A sealing portion 260 is provided between an inner surface of the second cap 250 and the second end of the membrane housing 210, to thereby prevent the moisture-containing unreacted gas supplied through the second inlet 251 from flowing into the plural second holes 212. That is, the second inlet 251 of the second cap 250 is in communication only with the plural second holes 212 so that the moisture-containing unreacted gas supplied through the second inlet 251 flows into the inside of the membrane housing 210 only through the plural second holes 212. The moisture-containing unreacted gas, which flows into the inside of the membrane housing 210 through the plural second holes 212, supplies the moisture for the reaction gas flowing in the hollow of the hollow fiber membranes 220.

Figure 2:
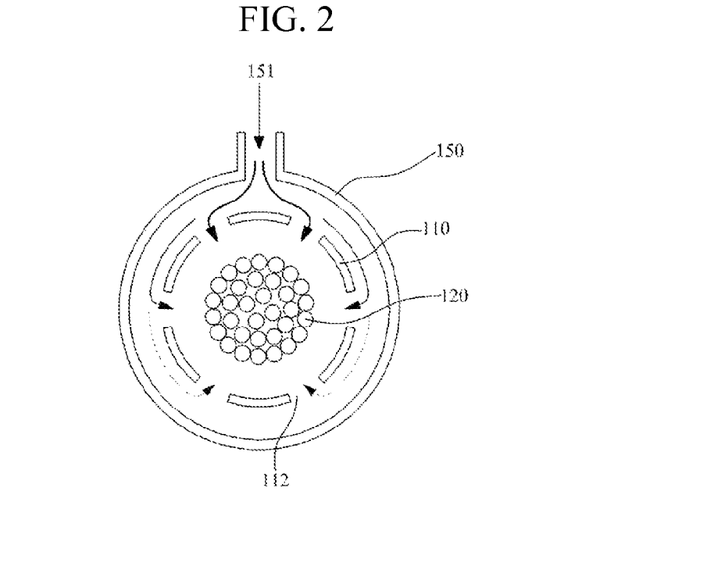

As shown in FIGS. 1 and 2, since the related tube-shaped humidifier 100 includes the plural second holes 112 provided along the circumstantial surface of the second end of the membrane housing 110, the amount of moisture-containing unreacted gas flowing in the second holes 112 positioned near to the second inlet 151 is different from the amount of moisture-containing unreacted gas flowing in the second holes 112 positioned distant from the second inlet 151. The moisture-containing unreacted gas shows straightness in path. In this respect, while the relatively-large amount of moisture-containing unreacted gas flows in the second holes 112 positioned near to the second inlet 151, the relatively-small amount of moisture-containing unreacted gas flows in the second holes 112 positioned distant from the second inlet 151. As a result, the large amount of moisture is supplied to the reaction gas flowing in the hollows of the hollow fiber membranes 120 positioned under the second holes 112 near to the second inlet 151; and the small amount of moisture is supplied to the reaction gas flowing in the hollow of the hollow fiber membranes 120 positioned under the second holes 112 distant from the second inlet 151. That is, the moisture is rarely supplied to the reaction gas flowing in the hollow of the hollow fiber membranes 120 positioned relatively distant from the second inlet 151. For the aforementioned process of supplying the moisture to the reaction gas, utilization efficiency of the hollow fiber membranes 120 positioned relatively distant from the second inlet 151 is considerably low, which might deteriorate the performance of the humidifier.

Meanwhile, as shown in FIGS. 3 to 5, the tube-shaped humidifier 200 according to one embodiment of the present invention includes plural projections 253 which are positioned above the plural second holes 212 along the circumference of the second end of the membrane housing 210, and are formed on the inner surface of the second cap 250. The plural projections 253 prevents the moisture-containing unreacted gas supplied through the second inlet 251 from flowing straightly, whereby the moisture-containing unreacted gas is in uniform contact with all the hollow fiber membranes 220 inside the membrane housing 210. Accordingly, the moisture is uniformly supplied to the reaction gas flowing in the hollow of the hollow fiber membranes 220, to thereby improve humidifying efficiency of the humidifier.

Referring to FIG. 5 corresponding to the cross section view of the tube-shaped humidifier 200 according to the present invention, the moisture-containing unreacted gas supplied into the inside of the humidifier through the second inlet 251 collides with the projections 253 on the inner surface of the second cap 250, whereby the collided moisture-containing unreacted gas is changed from laminar flow to turbulent flow, to thereby prevent the moisture-containing unreacted gas from flowing only into the second holes 212 near to the second inlet 251. Owing to the turbulent flow, the moisture-containing unreacted gas is uniformly distributed along the inner surface of the second cap 250 and the circumferential surface of the membrane housing 210. According as the moisture-containing unreacted gas is uniformly distributed to the plural second holes 212, the moisture-containing unreacted gas is uniformly supplied to the hollow fiber membranes 220. Thus, the tube-shaped humidifier 200 according to the present invention provides high humidifying efficiency, and also prevents some particular hollow fiber membranes 220 from being contaminated more seriously than other hollow fiber membranes 220, to thereby reduce maintenance and repair cost of the humidifier.

The projection 253 is not limited in shape. For instance, the projection 253 may be formed in a round shape such as a hemisphere, rounded cone and semicircle column, or angulated shape such as a cone, polygonal pyramid, spherical polygon and polygonal pillar. Preferably, the projection 253 is formed in a streamlined shape suitable for facilitating to generate the turbulent flow and preventing some of the hollow fiber membranes 220 from being especially contaminated. As the projections 253 are positioned above the second holes 212, it is possible to effectively prevent the unreacted gas from being especially concentrated in some of the hollow fiber membranes 220. Meanwhile, the appropriate number of projections 253 may be formed on the inner surface of the second cap 250. Preferably, the projections 253 are provided in one-to-one correspondence with the second holes 212 so that the moisture-containing unreacted gas is uniformly distributed to all second holes 212.

As mentioned above, the moisture-containing unreacted gas, which is supplied into the inside of the membrane housing 210 through the second inlet 251 and the plural second holes 212, is gradually dried by losing its moisture. The dried unreacted gas is discharged through the first outlet 242 of the first cap 240 to the external.

That is, the unreacted gas dried in the membrane housing 210 is discharged through the plural first holes 211 to the external of the membrane housing 210, and is then discharged through the first outlet 242 to the external of the humidifier 200. The sealing portion 260 prevents the unreacted gas discharged to the external of the membrane housing 210 from flowing into the first inlet 241. Thus, the unreacted gas discharged through the plural first holes 211 is discharged only through the first outlet 242 to the external of the humidifier 200.

While the reaction gas supplied to the inside of the humidifier 200 through the first inlet 241 flows along the hollow of the hollow fiber membranes 220, the reaction gas is supplied with the moisture, and thus is humidified. The second cap 250 includes a second outlet 252 for transmitting the humidified reaction gas to the fuel cell. The second outlet 252 is in communication with the hollow of the hollow fiber membranes 220, whereby the humidified reaction gas discharged from the hollow of the hollow fiber membranes 220 is supplied to the fuel cell through the second outlet 252.

That is, the sealing portion 260 positioned between the inner surface of the second cap 250 and the membrane housing 210 divides a space between the inner surface of the second cap 250 and the membrane housing 210 into a first space S1 and a second space S2. The first space S1 provides a passageway of gas between the hollow of the hollow fiber membranes 220 and the second outlet 252, and the second space S2 provides a passageway of gas between the second inlet 251 and the plural second holes 212.

In the same manner, the sealing member 260 positioned between the inner surface of the first cap 240 and the membrane housing 210 divides a space between the inner surface of the first cap 240 and the membrane housing 210 into respective two spaces, to thereby provide a passageway of gas between the first inlet 241 and the hollow of the hollow fiber membranes 220, and to provide a passageway of gas between the plural first holes 211 and the first outlet 242.

Figure 8:
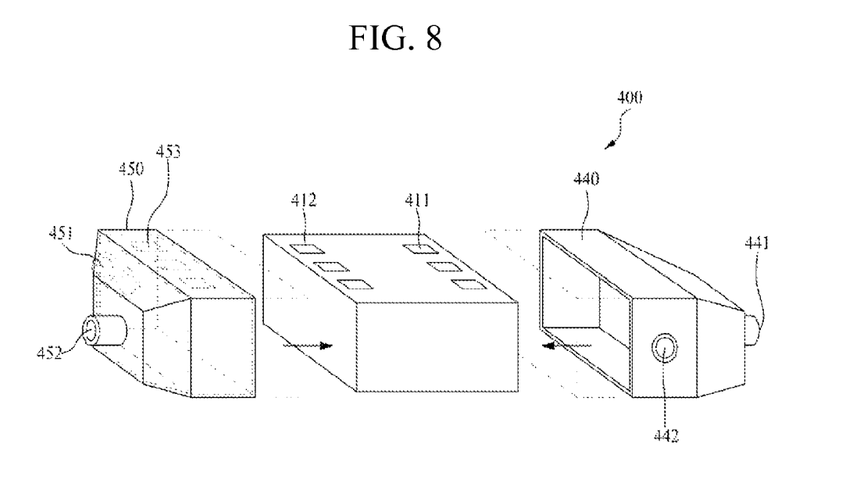
FIGS. 8 to 10 illustrate a square pillar shaped humidifier for fuel cell according to one embodiment of the present invention.
Figure 9:
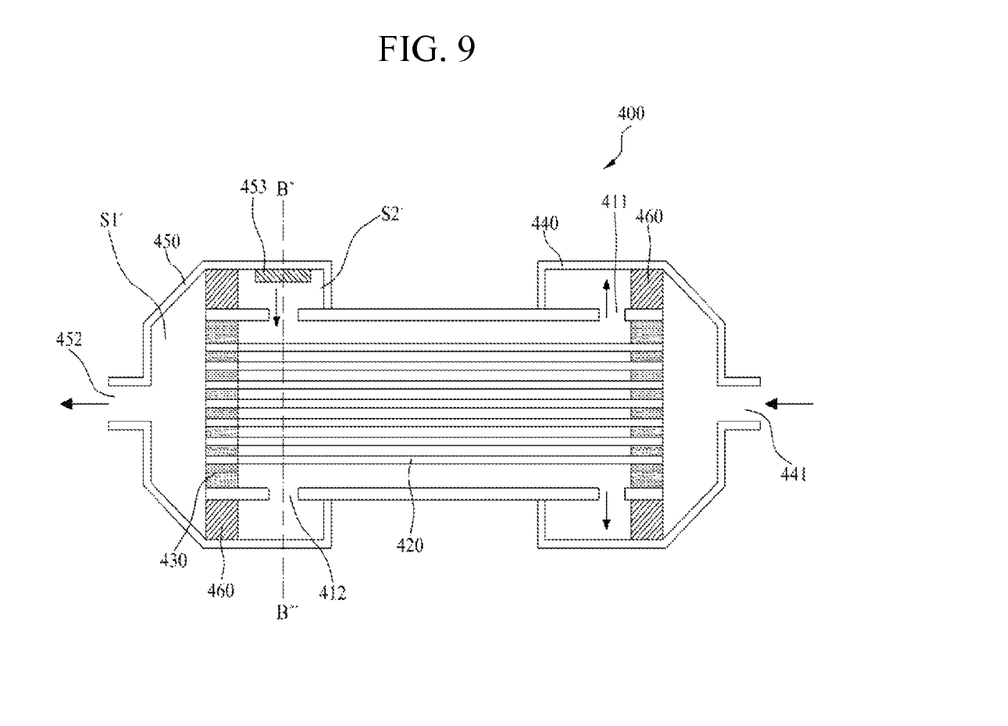
Figure 10:
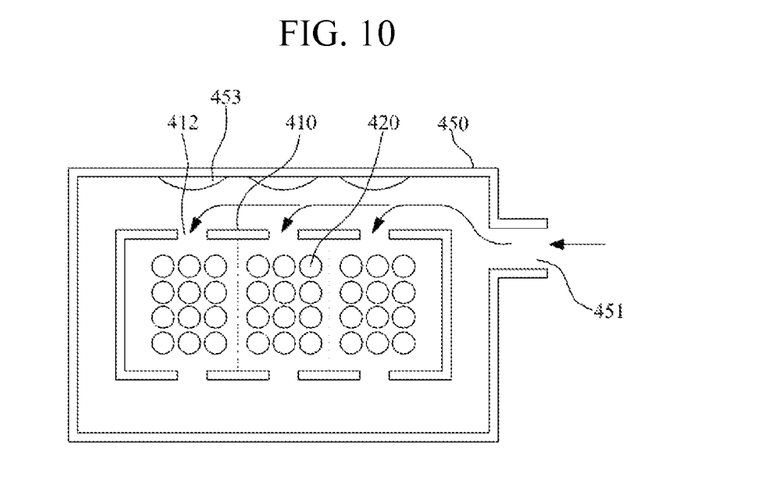

Another embodiment of the present invention discloses an polygonal pillar shaped humidifier such as a square pillar-shaped humidifier 400 instead of the aforementioned tube-shaped humidifier 200. The square pillar-shaped humidifier 400 according to another embodiment of the present invention will be described as follows.

The square pillar-shaped humidifier 400 is similar in structure to the tube-shaped humidifier 200. However, the square pillar-shaped humidifier 400 is different from the tube-shaped humidifier 200 in that the square pillar-shaped humidifier 400 has a square pillar-shaped membrane housing 410 and a cap 440 and 450 whose inner shape is square pillar-shaped to be suitable for the square pillar-shaped membrane housing 410.

The membrane housing 410 of the square pillar-shaped humidifier 400 is formed in the square pillar shape, whereby the inside of the membrane housing 410 is provided with bundles of plural hollow fiber membranes 420 at high density. In this respect, it would be preferable to use the square pillar-shaped humidifier 400 for a high-power fuel cell, not the tube-shaped humidifier 200.

Inside the membrane housing 410, there is a partition (not shown) for separately providing the bundles of hollow fiber membranes 420. As the hollow fiber membranes 420 are divided into the bundles by the partition (not shown), it is possible to shorten the time consumed until the humidified unreacted gas arrives at the hollow fiber membrane 420 positioned in the inner part of the bundle, to thereby improve the performance of humidifier.

In order to realize more-improved performance of the humidifier, the plural partitions may be installed in the membrane housing 410. If the partitions are excessively provided inside the membrane housing 410, the area occupied by the hollow fiber membranes 420 may be decreased, which may deteriorate the performance in humidifier. In consideration to the performance of humidifier, it is preferable to install the three to seven partitions inside the membrane housing 410.

In case of the related art square pillar-shaped humidifier 300 shown in FIGS. 6 and 7, there is a square pillar-shaped passageway between an upper plane of a membrane housing 310 with second holes 312 and a facing inner surface of a second cap 350. Accordingly, the moisture-containing unreacted gas supplied through the second inlet 351 flows straightly through the square pillar-shaped passageway without large resistance, whereby the unreacted gas flows concentratedly through the second holes 312 near to a second inlet 351. Especially, in comparison to the tube-shaped humidifier 100 where the unreacted gas flows through a curved passageway while colliding with an inner surface, the related art square pillar-shaped humidifier 300 where the unreacted gas flows through the square pillar-shaped passageway has the more serious problem caused by the unreacted gas concentrated in some of hollow fiber membranes 320.

However, the square pillar-shaped humidifier 400 according to the present invention includes plural projections 453 on an inner surface of a second cap 450, wherein the plural projections 453 are provided at respective positions corresponding to plural second holes 412 formed at an upper side of the membrane housing 410. Thus, the moisture-containing unreacted gas supplied through a second inlet 451 is in uniform contact with all bundles of hollow fiber membranes 420 inside the membrane housing 410.

Referring to FIG. 10 which illustrates the cross section of the square pillar-shaped humidifier 400 along B-B' of FIG. 9, the moisture-containing unreacted gas is supplied to the portion above the second holes 412 of the membrane housing 410 after being supplied into the inside of the humidifier 400 through the second inlet 451, and is then in collision with the projections 453. By collision with the projections 453, the unreacted gas is changed from laminar flow to turbulent flow, whereby the unreacted gas flows even to the second holes 412 distant from the second inlet 451. As a result, the unreacted gas is uniformly distributed to the plural second holes 412. The square pillar-shaped humidifier 400 according to the present invention provides high humidifying efficiency by uniformly distributing the moisture-containing unreacted gas to the bundles of hollow fiber membranes 420 for the supply of moisture to the reaction gas, and also prevents some particular hollow fiber membranes 420 from being contaminated more seriously than other hollow fiber membranes 420, to thereby reduce maintenance and repair cost of the humidifier.

An operation of the humidifier 200 and 400 for fuel cell according to the embodiment of the present invention shown in FIGS. 3 to 5 and 8 to 10 will be described as follows.

The reaction gas to be supplied to the fuel cell flows into the humidifier 200 and 400 through the first inlet 241 and 441. Simultaneously, the moisture-containing unreacted gas discharged from the fuel cell flows into the inside of the membrane housing 210 and 410 through the second inlet 251 and 451 and the plural second holes 212 and 412. The reaction gas flowing through the first inlet 241 and 441 is transmitted to the bundle of hollow fiber membranes 220 and 420, and is moved toward the second outlet 252 and 452 along the hollow of the hollow fiber membranes 220 and 420.

While the reaction gas supplied through the first inlet 241 and 441 is in the dry state, the unreacted gas supplied into the inside of the membrane housing 210 and 410 through the second inlet 251 and 451 and the plural second holes 212 and 412 contains the large amount of moisture therein, to thereby cause a difference in humidify between the inside and outside of the hollow fiber membranes 220 and 420. Due to the difference in humidify between the inside and outside of the hollow fiber membranes 220 and 420, the moisture contained in the unreacted gas selectively permeates through the hollow of the hollow fiber membranes 220 and 420; and the reaction gas moving toward the second outlet 252 and 452 through the hollow of the hollow fiber membranes 220 and 420 shows the high percentage of humidity.

Meanwhile, the moisture is removed from the unreacted gas which is supplied from the fuel cell to the inside of the membrane housing 210 and 410 through the second inlet 251 and 451 and the plural second holes 212 and 412, whereby the unreacted gas is gradually dried. The dried unreacted gas is discharged out of the humidifier 200 and 400 through the plural first holes 211 and 411 and the first outlet 242 and 442.

Owing to the aforementioned operation principle, the reaction gas whose humidify is higher than its original humidity is supplied to the fuel cell.

According to one embodiment of the present invention, the first inlet 241 and 441 for receiving the reaction gas to be supplied to the fuel cell, and the second inlet 251 and 451 for receiving the moisture-containing unreacted gas from the fuel cell are formed in the different caps. This is to sufficiently permeate the moisture contained in the unreacted gas through into the entire portions of the hollow fiber membranes 220 and 420 positioned inside the membrane housing 210 and 410. That is, in case of the reaction gas moving from the first inlet 241 and 441 to the second outlet 252 and 452, the reaction gas near to the first inlet 241 and 441 has the low percentage of humidity. However, as the humidity rate of the reaction gas is gradually increased as moving toward the second outlet 252 and 452 since the reaction gas is continuously supplied with the moisture from the unreacted gas. Thus, while the unreacted gas with the relatively-low rate humidity is in contact with the hollow fiber membranes 220 and 420 positioned at the first inlet 241 and 441, the unreacted gas with the relatively-high rate humidity is in contact with the hollow fiber membranes 220 and 420 positioned at the second outlet 252 and 452, whereby it enables to permeate the moisture uniformly into the entire portions of the hollow fiber membranes 220 and 420.

Selectively, the inlets for receiving the reaction gas to be supplied to the fuel cell and the unreacted gas provided from the fuel cell may be formed in the same cap. In this case, the other cap installed at the opposite side of the humidifier 200 and 400 may be provided with outlets for discharging the humidified reaction gas, and the unreacted gas from which the moisture is removed.

The humidifier 200 and 400 for fuel cell according to the present invention enables to uniformly supply the moisture-containing unreacted gas to the bundles of the hollow fiber membranes 220 and 420 inside the humidifier 200 and 400, to thereby prevent uneven contamination in some particular hollow fiber membranes, and to reduce maintenance and repair cost of the humidifier by extending a replacement period of the hollow fiber membranes.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A humidifier for fuel cell comprising:
   hollow fiber membranes;
   a housing structure to house the hollow fiber membranes therein, said housing structure including a first end, a second end positioned at an opposite side of the first end, and plural holes provided along the outer circumferential surface of the second end, wherein the hollow fiber membranes have a first end and a second end which respectively potted into the first and second ends of the housing structure, and wherein the hollow fiber membranes are positioned inside the housing structure; and
   a cap installed at the second end of the housing structure to encase the second end of the housing structure, wherein the cap has an inlet for supplying moisture-containing unreacted gas into the housing structure and is provided with plural projections on its inner surface,
   wherein the plural projections are positioned to correspond to and align with the respective holes of the housing structure, and
   wherein heights of the plural projections are substantially identical with each other.

2. The humidifier for fuel cell according to claim 1, wherein the housing structure is in a tube shape or polygonal pillar shape.

3. The humidifier for fuel cell according to claim 2, wherein the polygonal pillar-shaped housing structure includes internal partitions.

4. The humidifier for fuel cell according to claim 2, wherein the polygonal pillar-shaped housing structure is square pillar-shaped housing structure.

5. The humidifier for fuel cell according to claim 1, wherein the cap includes an outlet being in fluid communication with the hollow of the hollow fiber membranes, wherein humidified reaction gas from the hollow of the hollow fiber membranes is discharged through the outlet, and is supplied to a fuel cell.

* * * * *